United States Patent Office 3,465,224
Patented Sept. 2, 1969

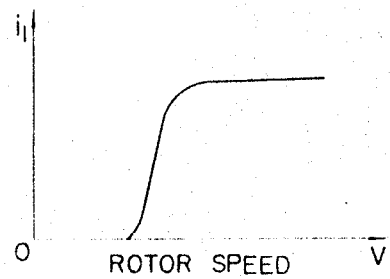
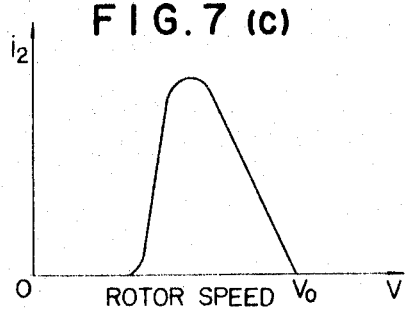
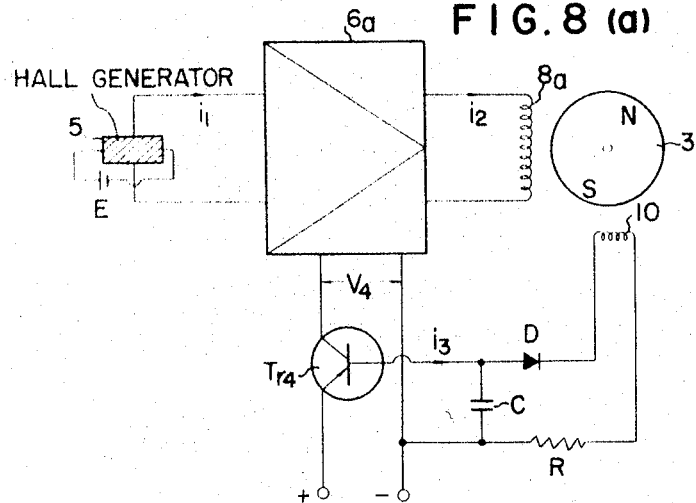
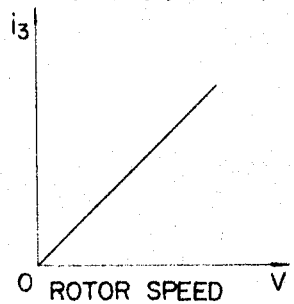
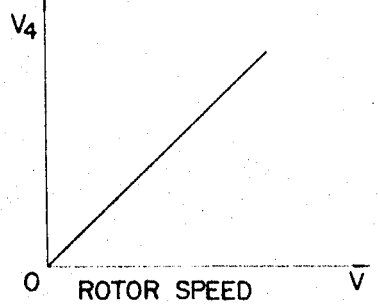

3,465,224
BRUSHLESS DIRECT-CURRENT MOTOR
Kiyo Takeyasu, Hachioji-shi, Tokyo-to, Japan, assignor to Kabushiki Kaisha Hitachi Seisakausho, Tokyo-to, Japan, a joint-stock company of Japan
Filed Aug. 30, 1965, Ser. No. 483,655
Claims priority, application Japan, Sept. 1, 1964, 39/49,478
Int. Cl. H02k 29/00; H02p 5/06
U.S. Cl. 318—138
3 Claims

ABSTRACT OF THE DISCLOSURE

A brushless D-C motor wherein rotation of the rotor is maintained by utilizing means to detect the rotor position and by varying, in accordance with the rotor position so detected, the polarity of magnitude of the armature, and the armature winding is divided into a plurality of parts, and there are provided means to cause a first armature current supplied to one of said parts to assume a high value at the time of starting of the rotor and to decrease as the rotor speed increases, and means to cause a second armature current supplied to another of the parts to be of low value in the regions of relatively low rotor speed and to increase as the rotor speed increases, whereby the total current value of the first and second armature currents in the neighborhood of the rotor starting point is caused to be substantially equal to that in the neighborhood of the rated speed.

---

This invention relates to brushless direct-current motors and more particularly to a brushless D-C motor in which current limiting through the use of a starting resistance, as is resorted to in a D-C shunt motor, is not carried out.

More specifically, the invention concerns a new brushless motor wherein the armature winding is divided into a plurality of parts, and an armature current which is of maximum value in the neighborhood of the starting point and decreases with increasing rotor speed is applied to one of the armature windings so divided while a maximum armature current is applied to another of the divided aramature windings at a point of any relatively high speed other than a point in the neighborhood of the starting point and a point corresponding to no-load speed, and wherein the total value of the armature current flowing through both of these divided armature windings can be limited to be below a certain value, whereby a great difference between the starting current and the rated current is prevented from arising.

It is a general object of the present invention to provide a brushless motor of the above stated character whereby a difficulty heretofore accompanying brushless D-C motors as described more fully hereinafter is overcome.

That is, an object of the invention is to provide a brushless D-C motor which does not impose a large load on the power source or amplifier, and in which the risk of temperature rise in the armature and the demagnetizing of the permanent magnet rotor due to high current is eliminated, the operation of said motor being highly efficient with only small speed fluctuations.

Another object of the invention is to provide a brushless D-C motor of the above stated character which is of relatively simple construction and operation.

The nature principle, and details of the invention will be more clearly apparent from the following detailed description, when read in conjunction with the accompanying drawings in which like parts are designated by like reference characters and numerals, and in which:

FIGS. 1(a) and 1(b) are graphical representations showing characteristic curves for description of the principle of a D-C shunt motor of general type;

Figure 6A:
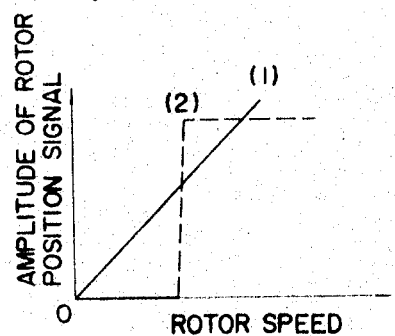
Figure 6B:
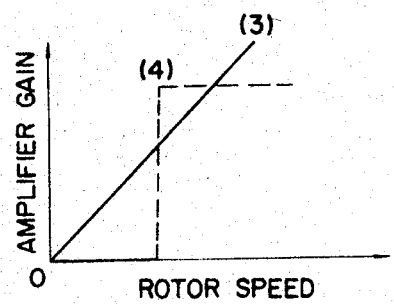
Figure 6C:
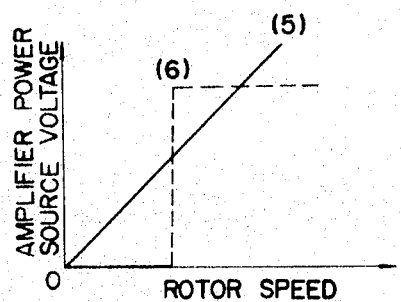

FIGS. 6(a), 6(b), and 6(c) are graphical representations indicating other characteristics of the motor according to the invention; and FIGS. 7(a), 7(b), 7(c), 8(a), 8(b), 8(c), 9(a), 9(b) and 9(c) are schematic diagrams and characteristic graphical representations indicating respectively different embodiments of the invention.

As conducive to a full appreciation of the nature and utility of the present invention, the following consideration of D-C motors in general and difficulties encountered in the prior art with respect to brushless D-C motors is set forth.

Figure 1A:
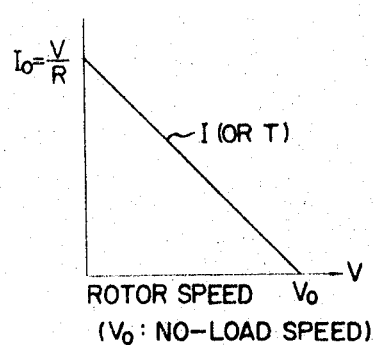
Figure 1B:
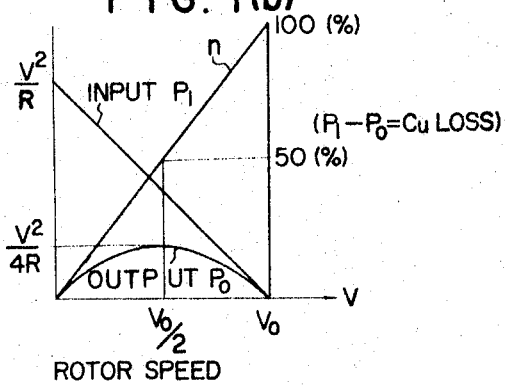

As is known, in a D-C shunt motor, the speed electromotive force (hereinafter termed "speed E.M.F.") E is proportional to the motor speed, and the torque T is proportional to the current. Furthermore, at no-load speed, the speed E.M.F. E is equal to the impressed voltage V, and, moreover, $T=0$. These relationships are indicated in FIG. 1 and by the following Equations 1, 2, and 3.

$$V = E + IR \quad (1)$$

$$\underset{\text{(Electrical input)}}{VI} = \underset{\text{(Mechanical output)}}{EI} + \underset{\text{(Copper loss)}}{I^2R} \quad (2)$$

$$\underset{\text{(Efficiency)}}{\eta} = \frac{EI \text{ (Mech. output)}}{VI \text{ (Elect. input)}} = \frac{E}{V} \quad (3)$$

According to these relationships, the electrical input $P_i$ assumes the maximum value $V^2/R$ at the time of starting, while the mechanical output $P_o$ of the motor becomes a maximum at a speed which is one half of the no-load speed $v_o$, this maximum value becoming exactly ¼ of the electrical input at the time of starting. It is to be observed further that the efficiency increases as the no-load speed is approached.

However, as is apparent from Equations 1, 2, and 3 or from FIG. 1, the output in the vicinity of the no-load speed $v_o$ is extremely low in comparison with the input in the neighborhood of the time of starting of the motor. Stated conversely, the input at the time of starting is extremely high in comparison with the output in the vicinity of the no-load speed.

Furthermore, a feature of a D-C shunt motor is that, by taking its rated speed in the neighborhood of its no-load speed, the speed fluctuation is kept low, and the efficiency is caused to be high. Accordingly, the motor is so designed that the rated speed approaches its no-load speed as much as possible to obtain sufficient mechanical output.

Figure 2A:
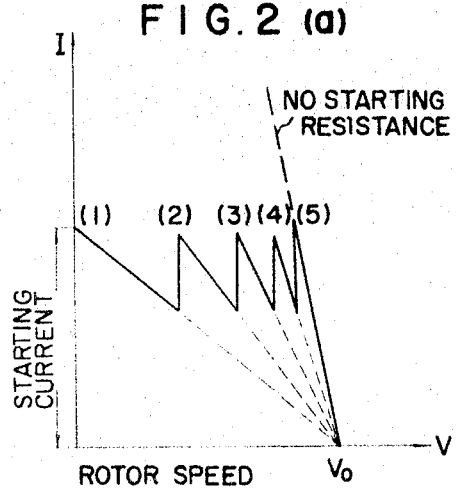
FIG. 2(a) is a graphical representation indicating the armature current versus speed characteristic of a D-C machine in the case where a graded starting resistance is used according to conventional practice.
Figure 2B:
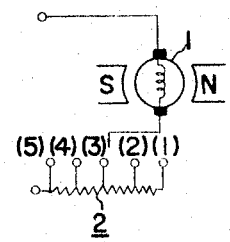
FIG. 2(b) is a schematic diagram illustrating the case when said graded starting resistance is connected to a D-C machine.

It is apparent from the above two points that if the power source voltage V were applied to the motor at starting, not only would a great load be imposed on the power source, but there would arise the risk of heat or burning damage to the armature winding. For this reason, it is the ordinary practice, as indicated in FIGS. 2(a) and 2(b), to start a motor 1 as the armature current is prevented from exceeding a certain value by using a series resistance 2 at the time of starting and to short-circuit this resistance after the rated speed has been reached.

That is, in a D-C shunt motor, it is desirable that limiting of the current be accomplished by causing the resistance value of the armature winding to be high at the time of starting, to decrease as the speed increases, and to become a specific value at the rated speed.

As is further known, the operational principle of a brushless D-C motor of the type wherein the rotor position is detected, and the rotation is maintained by switching the polarity or the magniude of the armature current in accordance with the detected rotor position, such as, for example, a brushless D-C motor in which a Hall generator is used as the rotor position detector, is the same as the operational principle of a D-C shunt motor. Accordingly, the various characteristics of a brushless motor of this type are also similar to those of the motor in the case illustrated in FIG. 1.

Figure 3:
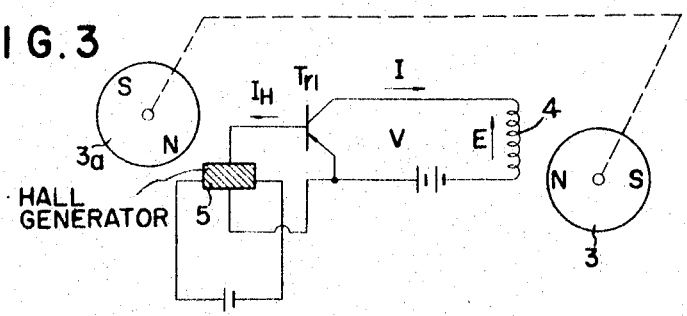
FIG. 3 is a schematic diagram indicating the principle of a brushless D-C motor in which a Hall generator is used.

The principle of one example of a conventional brushless D-C motor of this type in which a Hall generator is used is indicated in FIG. 3. Rotation of a magnet rotor 3 causes a current and a speed E.M.F. E to be produced in an armature winding 4, the speed E.M.F. E becoming large in proportion to the rotational speed. The bias voltage between the collectors and emitters of transistors $Tr_1$ and $Tr_2$ becomes $V-E$ and is in inverse proportion to the speed. On the other hand, the output of a Hall generator 5 which is the base input is constant irrespective of the rotational speed. Accordingly, the following equation, which is the same as Equation 1, is obtained.

$$I = \frac{V-E}{R}$$

where R is the armature resistance.

That is, the characteristics of a brushless D-C motor in which a Hall generator is used as a rotor position detector are exactly the same as the characteristics of a D-C shunt motor. Therefore, an essential condition for the use of a brushless D-C motor of the type referred to above with high efficiency and small speed fluctuation is that the current be limited by some method. Moreover, it is important to prevent the demagnetizing of the permanent magnet rotor due to large armature current particularly in case of brushless D-C motor.

In this case, however, there exists a serious difficulty in that the above described mechanical control operation through the use of a resistance starter as in the case of a D-C shunt motor gives rise to extreme complications in design and operation, and there has heretofore been a pressing need for circuit means to accomplish the above mentioned limiting of the current of brushless motors.

The present invention contemplates the provision of a brushless D-C motor whereby the above need is satisfied.

Figure 4:
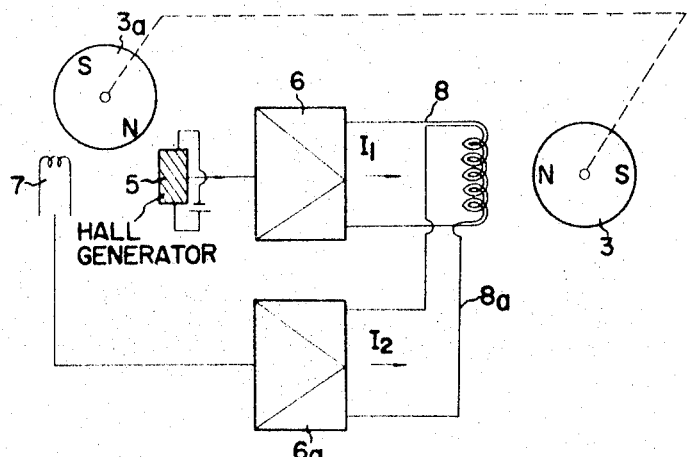
FIG. 4 is a schematic diagram showing the composition and arrangement of one embodiment of the brushless motor according to the invention.

In one embodiment of the invention as shown in FIG. 4, there are provided identical or intercoupled rotors 3 and 3a each having an even number of magnetic poles, armature windings 8 and 8a, one or a plurality of Hall generators 5, amplifiers 6 and 6a, and a detector 7 for detecting the rotor position and speed, such as, for example, a detection coil.

As shown in FIG. 4, the armature winding is divided into two windings 8 and 8a. The armature winding 8 is supplied with an armature current $I_1$ produced by amplifying the output of the Hall generator 5 by means of an amplifier 6 comprising components such as transistors, and the other armature winding 8a is supplied with an armature current $I_2$ produced as the output of an amplifier 6a to which the output voltage of a rotor position detector coil 7 is applied as input.

Figure 5:
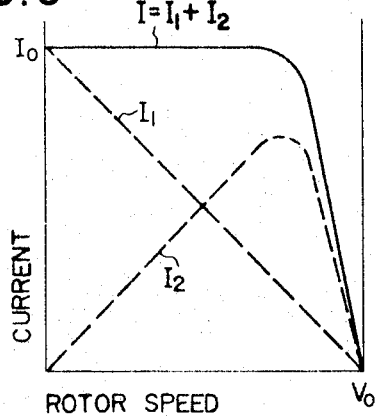
FIG. 5 is a graphical representation indicating characteristics of the motor according to the invention.

Then, since the output of the Hall generator 5 is constant irrespective of the motor speed, the current $I_1$ flowing through the armature winding 8 varies with motor speed as indicated by the curve $I_1$ in FIG. 5. On the other hand, since the magnitude of the output voltage of the speed detection coil 7 increases with the motor speed (from zero at the start), the armature current $I_2$ of the armature winding 8a is zero at the start of the motor and increases with the motor speed up to a certain speed between zero and the no-load speed $v_0$, at which said certain speed of the amplifier 6a becomes saturated, and, as the speed increases further thereafter, the armature current $I_2$ decreases, as indicated by curve $I_2$ in FIG. 5.

Consequently, the resultant current $(I_1+I_2)$ of the currents $I_1$ and $I_2$, in effect, becomes limited to a certain value or therebelow as indicated by the curve I in FIG. 5. This resultant effect is equivalent to that of the starting current being limited in a D-C shunt motor.

That is, the maximum power input $(I_0 \times V)$ is the same in the case where only the amplifier 6 is used and in the case where the amplifier 6a is additionally used, and, moreover, when the amplifier 6a is additionally used, the current increases in the region where the speed is relatively high, whereby the mechanical output becomes extremely large. The reason for this is indicated by the following relationships.

$$T = K_1 I$$

where:

T is the torque;
I is the armature current; and
$k_1$ is a constant.

$$P_o = k_2 T v = k_1 k_2 I v$$

where:

$P_o$ is the mechanical output;
$v$ is the motor speed; and
$k_2$ is a constant.

Stated conversely, even if the motor is designed to apply a specific current at a high speed in the neighborhood of the no-load speed to produce only the required mechanical output $(k_1 k_2 I v)$, the current will be limited at low speeds.

The current-speed characteristics present with $I_1$ in FIG. 5 can be obtained, for example, by means of a D-C amplifier and a rotor position detector such as a Hall generator for applying a rotor position signal of a magnitude unrelated to the motor speed. On the other hand, in order to cause the armature current to attain maximum value as shown by the curve $I_2$ in FIG. 5 at a relatively high speed except for the starting point and no-load speed, the circuit arrangement, for example, from the rotor position detector 7 such as a Hall generator or the like through an amplifier, to the armature winding 8a, may be contemplated in the following three basic manners.

(a) The operation whereby the amplitude of the rotor position signal of the detector 7 shown in FIG. 4 is a minimum or zero at the time of starting and increases with motor speed, as indicated by the curve 1 in FIG. 6(a), or is extremely small or zero in the neighborhood of the starting point and increases abruptly from a certain speed, as indicated by the curve 2 in FIG. 6(a).

(b) The operation whereby the amplifier gain is a minimum or zero at the time of starting and increases with increase in the motor speed, as indicated by the curve 3 in FIG. 6(b), or is extremely small or zero in the neighborhood of the starting point and increases abruptly from a certain speed as indicated by the curve 4 in FIG. 6(b).

(c) The operation whereby the value of the supply voltage of the amplifier output stage is a minimum at the time of starting and increases with increase in motor speed, as indicated by the curve 5 in FIG. 6(c), or is extremely low or zero at the time of starting and increases abruptly at a certain speed, as indicated by the curve 6 in FIG. 6(c).

These methods may be used singly or in combination of two or three.

The characteristic shown by the curve 1 in FIG. 6(a) can be obtained in the case where a coil is used for the rotor position detector as described hereinabove and as indicated in FIG. 4. The characteristic shown by the curve 2 in FIG. 6(a) can be obtained by passing the rotor position signal $i_D$ through, for example, a high-pass filter 9 comprising, for example, a capacitance C and an inductance L, as shown in FIG. 7(a).

Figure 7A:
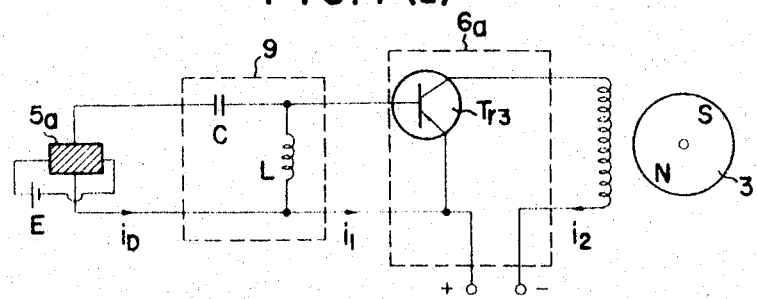

In FIG. 7(a), the part designated by reference numeral 6a is an amplifier in which a single transistor $Tr_3$ is shown, but this transistor $Tr_3$ may be in the form of a plurality of transistors. That is, when the output current $i_D$ of means such as a Hall generator 5a for applying a constant output unrelatedly to the rotor speed is passed through a high-pass filter 9, only a current of a region of relatively high speed is passed as indicated in FIG. 7(b). When this current enters the amplifier, it becomes saturated at a certain speed and thereafter decreases with increasing speed, and the level of the output current of the amplifier, that is, the armature current $i_2$, becomes such as indicated in FIG. 7(c).

Next, the characteristic shown by the curve 3 in FIG. 6(b) can be obtained, for example, by inserting a capacitance into the input stage of a D-C amplifier and lowering the gain in the low-frequency band. The characteristic shown by the curve 4 in FIG. 6(b) can be obtained by means of a so-called narrow-band amplifier.

The characteristic shown by the curve 5 in FIG. 6(c) can be obtained, for example, by limiting the supply voltage of the amplifier in accordance with the speed by means of a circuit arrangement as shown in FIG. 8(a) comprising a speed detecting coil 10, a transistor $Tr_4$, a diode D, a capacitance C, and a resistance R. More specifically, when the output current $i_1$ from means such as, for example, the Hall generator 5 shown, which supplies rotor position signals of a constant level unrelatedly to the rotor speed, is applied to the amplifier, and the current induced in the speed detecting coil 10, due to the rotation of another rotor, is passed through the diode D and smoothed by a smoothing circuit formed by the capacitance C and the resistance R, the base current $i_3$ of the transistor $Tr_4$ assumes the characteristic indicated in FIG. 8(b). Therefore, as indicated in FIG. 8(c), the supply voltage $V_4$ of the amplifier is limited in the region of low rotor speed $v$ and progressively rises as the rotor speed increases.

Figure 9A:
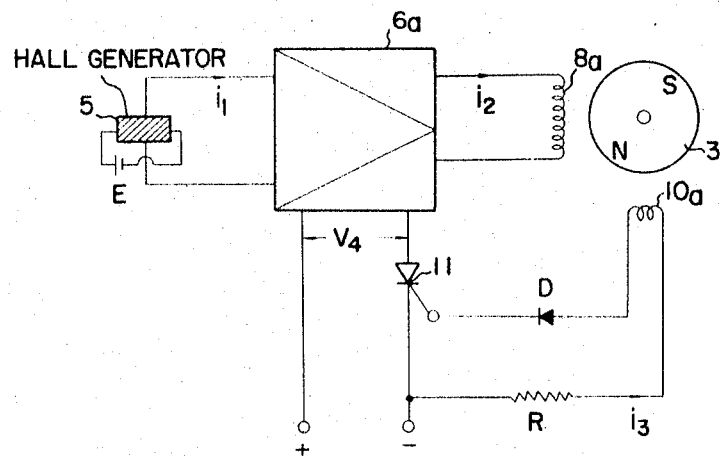
Figure 9B:
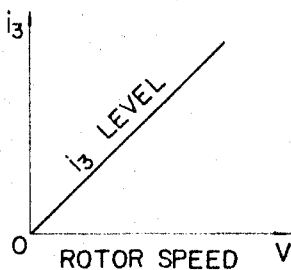
Figure 9C:
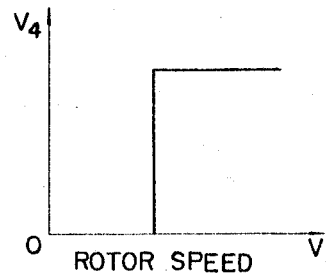

The characteristic shown by the curve 6 in FIG. 6(c) can be obtained, for example, by a circuit arrangement in which a contactless switch is inserted between the amplifier and its power source as shown in FIG. 9(a), the contactless switch being formed by a silicon-controlled rectifier (SCR) 11 so disposed as to impress the voltage induced in the speed detecting coil 10a to a gate. That is, by adapting the silicon-controlled rectifier 11 to assume the "ON" state when, as the rotor speed increases, the induced voltage of the detecting coil 10a reaches a certain value, the amplifier and power source can be short-circuited, whereby a source voltage $V_4$ can be impressed on the amplifier as indicated in FIGS. 9(b) and 9(c).

It will be obvious to those skilled in the art that the above described methods are applicable also to motors of the multipole, multiphase type and that, furthermore, as described hereinbefore, there is no limit to the number of amplifiers or armature windings.

As is apparent from the foregoing description, the present invention provides a brushless D-C motor which does not impose an excessive load on the power source or amplifier, and in which, moreover, it is possible to eliminate the risk of temperature rise of the armature winding and demagnetizing of the permanent magnet rotor due to large current. Furthermore, since it is possible to set the rated speed in the neighborhood of the no-load speed in the motor of this invention, the features of high efficiency and small speed fluctuation, which are highly advantageous as characteristics and for design, are attainable.

Summarily stated, the present invention resides essentially in a brushless motor in which the armature winding is divided into a plurality of parts, and an armature current which is of maximum value in the neighborhood of the starting point and decreases with increasing rotor speed is applied to one of said parts of the armature coil while a maximum armature current is applied to another of said parts at a point of any relatively high speed other than a speed in the vicinity of the starting point and the no-load speed, whereby the total value of the armature current flowing through both parts of the armature winding can be limited to be below a certain value.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What I claim is:

1. A brushless direct current motor comprising: a rotor; means for detecting the position of said rotor by an electrical signal generated in accordance with the angular position of said rotor; means for detecting the rotor speed by electrical signals generated in proportion to the rotating speed of said rotor; amplifiers for amplifying the output signals of said position detecting means and rotor speed detecting means; means for driving said rotor and disposed within the surrounding space of said rotor and including at least two armature windings, the output signal of said position detecting means amplified by one of said amplifiers being applied to one of said armature windings and the output signal of said rotor speed detecting means amplified by the other of said amplifiers being applied to the other of said armature windings, whereby the total value of current flowing through said armature windings is made substantially equal at a value between the current value of the rotor starting point and that of the rated speed.

2. A brushless direct current motor comprising: a rotor; means for detecting the position of said rotor by an electrical signal generated in accordance with the angular position of said rotor; means for generating a control signal responsive to the angular position of said rotor; a first amplifier for amplifying the output of said rotor position detecting means; a filter circuit supplied with said control signal to cause to pass only the required frequency component of said control signal; a second amplifier for amplifying the output of said filter; and means for driving said rotor having at least two armature windings and disposed within the surrounding space of said rotor, one of said armature windings being supplied with the output of said filter through said second amplifier and the other of said armature windings being supplied with the output of said first amplifier, whereby the total value of current flowing through said armature winding is made substantially equal between the starting point of the rotor and the rated speed thereof.

3. A brushless direct current motor comprising: a rotor; means for detecting the position of said rotor by electrical signal generated therefrom in accordance with the angular position of the rotor; means for generating a control signal responsive to the rotor position; a first amplifier for amplifying the output of said rotor position detecting means; a second amplifier for amplifying said control signal; means for generating a signal responsive to the speed of said rotor, said signal being supplied to the second amplifier to control the operating voltage of said second amplifier; and means for driving said rotor having at least two armature windings and disposed within the surrounding space of said rotor, one of said armature windings being supplied with the output of said first amplifier and the other of said armature windings being supplied with the output of said second amplifier, whereby the total value of current flowing through said armature windings is made substantially equal between the starting point of said rotor and the rated speed thereof.

References Cited

UNITED STATES PATENTS

| | | | |
|---|---|---|---|
| 2,814,008 | 11/1957 | Staniloff | 318—254 XR |
| 3,148,318 | 9/1964 | Bradburn | 318—154 |
| 3,230,356 | 1/1966 | Pochapsky et al. | 318—408 |
| 3,242,406 | 3/1966 | Tanaka | 318—138 |
| 3,250,971 | 5/1966 | Brunner et al. | 318—138 |
| 3,290,572 | 12/1966 | Hartmann | 318—138 |
| 3,319,104 | 5/1967 | Yasuoka et al. | 318—138 |

ORIS L. RADER, Primary Examiner

G. R. SIMMONS, Assistant Examiner

U.S. Cl. X.R.

318—340, 254